Dec. 15, 1970 L. L. CHARLSON 3,547,564

FLUID OPERATED MOTOR

Filed Dec. 31, 1968 4 Sheets-Sheet 1

INVENTOR.

LYNN L. CHARLSON

BY *Robert W. Doyle*

ATTORNEY

FLUID OPERATED MOTOR

Filed Dec. 31, 1968

INVENTOR.
LYNN L. CHARLSON
BY Robert W. Doyle
ATTORNEY

INVENTOR.
LYNN L. CHARLSON
BY Robert W. Doyle
ATTORNEY

Dec. 15, 1970 L. L. CHARLSON 3,547,564

FLUID OPERATED MOTOR

Filed Dec. 31, 1968 4 Sheets-Sheet 4

INVENTOR.
LYNN L. CHARLSON
BY Robert W. Doyle
ATTORNEY

United States Patent Office 3,547,564

Patented Dec. 15, 1970

3,547,564

FLUID OPERATED MOTOR

Lynn L. Charlson, St. Louis Park, Minn., assignor to Germane Corporation, Minneapolis, Minn., a corporation of Minnesota Filed Dec. 31, 1968, Ser. No. 788,284

Int. Cl. F01c *1/04*

U.S. Cl. 418—61 9 Claims

ABSTRACT OF THE DISCLOSURE

A fluid operated motor of the axial valve type wherein the shaft and valve are separate and concentric and wherein the valve mates with and takes its alignment from the housing and is pressure balanced thereby providing optimum efficiency at high operating pressures This invention relates to fluid operated motors and, more particularly, relates to fluid operated motors of the axial valve type wherein the valve is separate from and concentric with the shaft and mates with and takes its alignment from the housing and is pressure balanced to provide a motor operable at optimum efficiency at high operating pressures.

Although fluid operated motors of the axial valve type have been utilized in the past, the application of these motors has been limited because of their lack of ability to function efficiency under high operating pressures. In an axial valve motor having a valve independent of, and concentric with, the output shaft high operating pressures tend to urge the valve inwardly toward the shaft and away from the mating valve surfaces in the housing. This causes leakage paths between the housing and the valve and corresponding inefficiencies. Since the valve takes its alignment from the housing and is unaffected by misalignment of the shaft within the housing, there is necessarily a predetermined spacing between the valve and the shaft and consequently the valve is unsupported against radially inwardly projecting loads. Valve leakage in this type of valve is a function of operating pressure and it is possible under extreme pressure for valve failure to occur and a complete malfunction of the unsupported valve such as breaking of the valve to result.

In a fluid operated motor having a shaft supported within the housing, loads are placed on the shaft during operation causing misalignment of the shaft in the housing. This misalignment can affect the spacing between the shaft and concentric valve. Balancing of the valve, as discussed above, must also be provided in this instance. This shaft misalignment can also result from tolerance within the bearings or normal wear of moving components.

Fluid operated motors which function properly at high operating pressures, but which are unduly complicated and correspondingly expensive, are obviously undesirable.

With these comments in mind, it is to the elimination of these and other disadvantages to which the present invention is directed, along with the inclusion therein of other novel and desirable features.

An object of this invention is to provide a new and improved fluid operated motor of simple and inexpensive construction and operation.

Another object of this invention is the provision of a fluid operated motor of the axial valve type capable of functioning efficiently and properly under high operating pressures.

Still another object of this invention is the provision of a novel fluid operated motor wherein the valve is driven by the output shaft, but takes its alignment from the housing, and wherein the output shaft is supported in the housing independent of the valve and wherein the valve is pressure balanced regardless of shaft misalignment from radial loads or normal wear.

A further object of this invention is the provision of a fluid operated motor capable of efficient and long life operation under high pressures and high radial loads in that normal wear of the motor components does not affect efficient operation of the motor.

A still further object of this invention is the provision of a new and novel fluid operated motor wherein the valve is pressure balanced and maintained in precision fit relative to the mating passages in the motor housing.

An additional object of this invention is the provision of a fluid operated motor capable of reverse rotation with immediate pressure balancing in either direction.

These and other objects and advantages of this invention will more fully appear from the following description made in connection with the accompanying drawings, wherein like reference characters refer to the same or similar parts throughout the several views, and in which.

Figure 1:
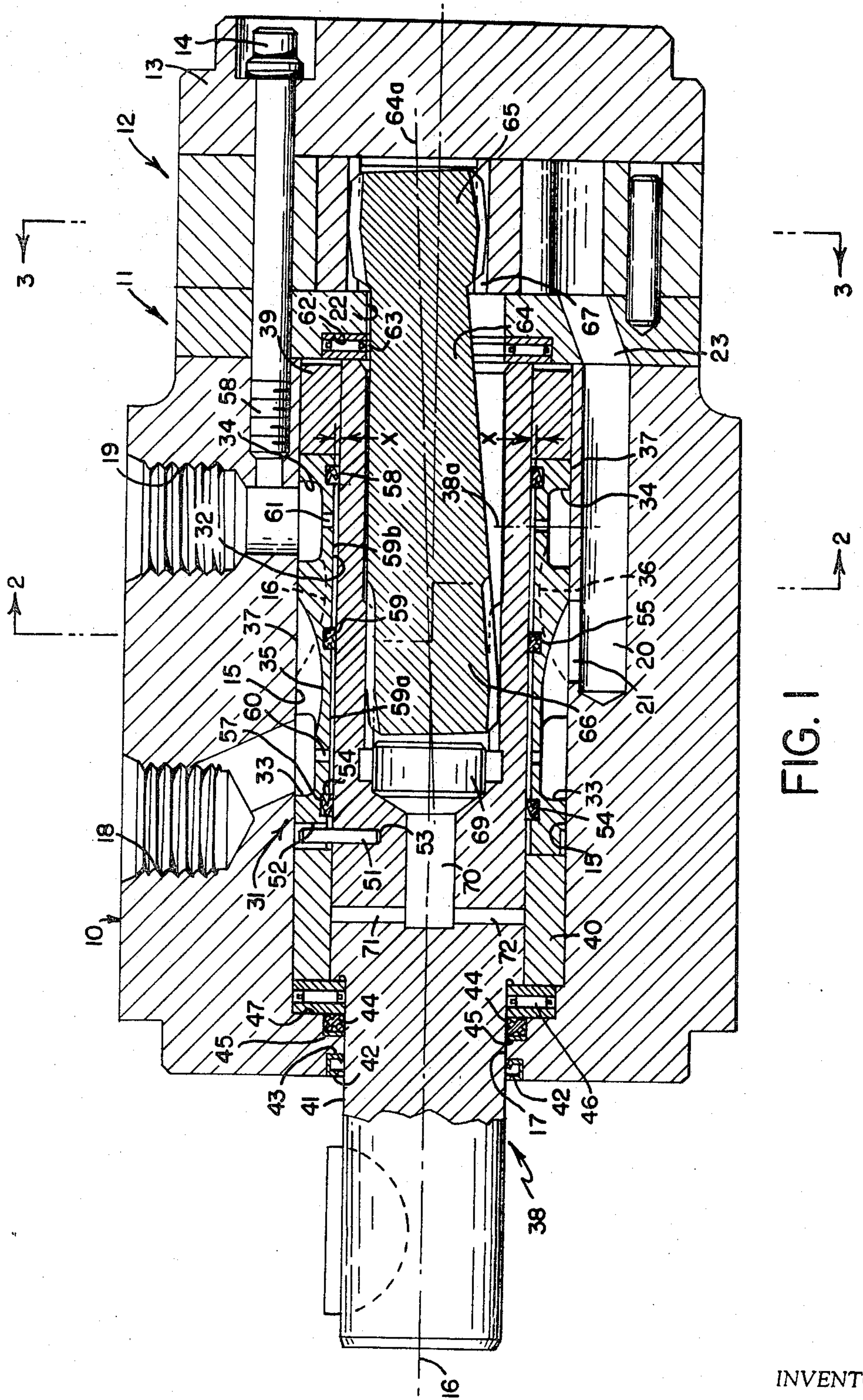
FIG. 1 is a longitudinal sectional view of a fluid operated motor, taken along the line 1—1 of FIG. 2.
Figure 2:
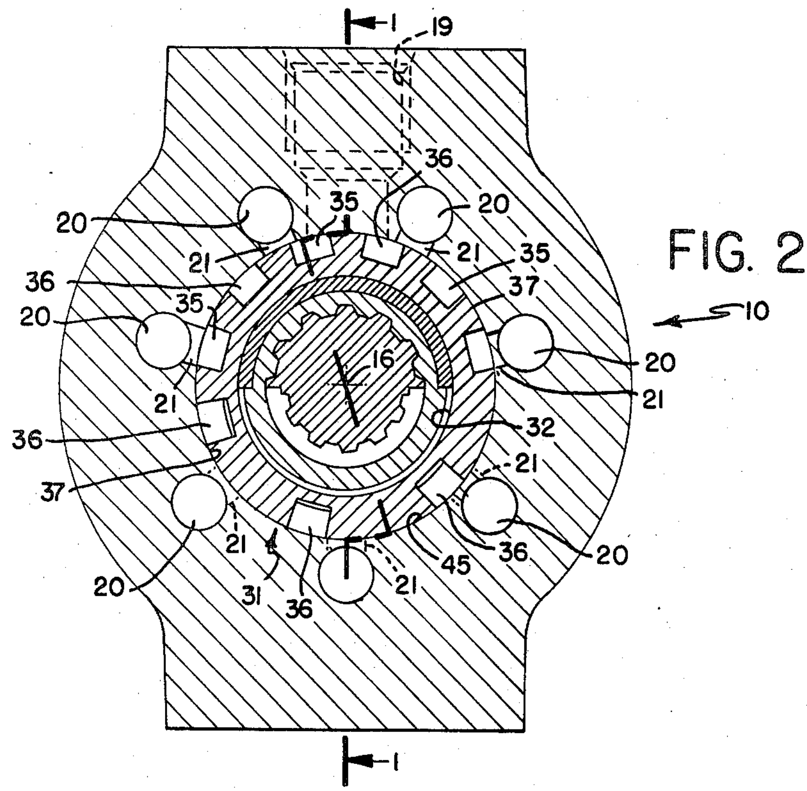
FIG. 2 is a sectional view taken along the line 2—2 of FIG. 1.

The fluid operated motor shown in FIG. 1 is generally cylindrically shaped and comprises several sections. A valve housing is indicated at 10. A valve plate section 11 is positioned adjacent valve housing 10, and an internal gear set section 12 is positioned adjacent valve plate 11, sandwiching valve plate 11 between valve housing section 10 and gear set section 12. An end cover plate 13 is positioned adjacent internal gear set section 12, sandwiching gear set section 12 between the cover plate 13 and the valve plate section 11. A plurality of axially extending bolts 14 join the cover plate 13 with gear set 12, valve plate 11 and valve housing 10 forming a generally cylindrically shaped motor frame or body.

Valve housing 10 includes a valve receiving bore 15 extending axially thereof along the axis of the motor as indicated by the motor axis or housing center line 16. A counterbore 17 concentric with bore 15 is provided and is adapted to receive a motor sealing assembly. Ports 18 and 19 are provided in housing section 10 to conduct inlet fluid and exhaust fluid. Depending upon the desired direction of rotation of the output shaft, one port would conduct inlet fluid, the other exhaust fluid. Ports 18 and 19 communicate with internal bore 15. Valve housing section 10 also includes a plurality of axially extending and radially spaced fluid passages 20. Each passage 20 includes an opening 21 providing fluid communication between passage 20 and bore 15.

Valve plate section 11 includes bore 22, which is concentric with bore 15 of valve housing section 10. Valve plate section 11 includes a plurality of angulated fluid receiving passages 23 corresponding in number and position and in fluid communication with the plurality of passages 20 of valve housing section 10.

Figure 3:
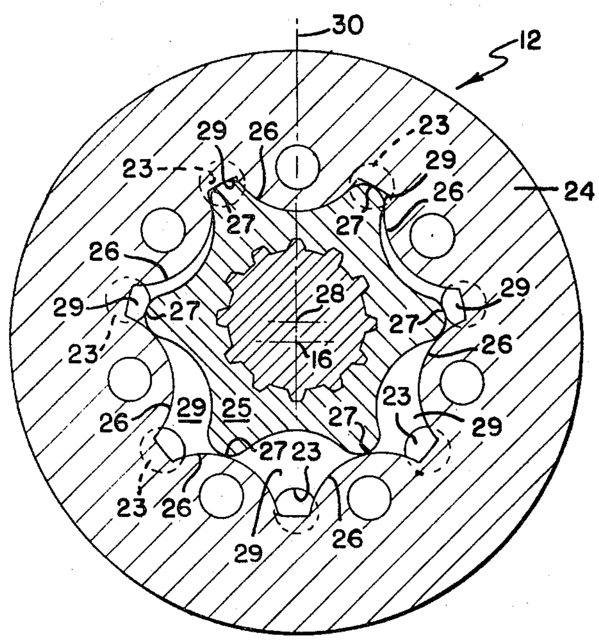
FIG. 3 is a sectional view taken along the line 3—3 of FIG. 1.

Referring now to internal gear set section 12, the construction thereof is best shown in FIG. 3. Internal gear or gerotor set 12 comprises an external ring member 24 and mating internal star member 25. Ring member 24 has a plurality of internal teeth 26 and mating star member 25 has a plurality of external teeth 27 numbering one fewer than the number of internal teeth of ring member 24. Star member 25 is eccentrically disposed in ring member 24. Star member 25 orbits relative to ring member 24 about motor axis 16 and rotates on its axis 28. During this orbital movement the external teeth 27 of the star member mesh with the ring member teeth in sealing engagement to form expanding and contracting cells 29 which are equal in number to the number of teeth of ring member 24, and in fluid communication with passages 20 in valve housing 10.

A line of eccentricity of the gerotor or internal gear set 12 is shown by center line 30 and is defined as that line which passes through axis 28 of the star member 25 and axis 16 of ring member 24. The function of a gerotor set is well known and will not be described in detail herein. The star and ring members are typically constructed of hardened steel, although other materials may be used if desired.

A cylindrically shaped axial valve 31 having an outer diameter corresponding to the inner diameter of bore 15 is positioned in bore 15 of housing 10 in precision fit relative thereto. Valve 31 is a commutating type valve and includes bore 32 therein adapted to receive a shaft substantially concentric therewith. Valve 31 includes a pair of annular and axially spaced ring grooves 33 and 34, positioned thereon whereby constant fluid communication is maintained between port 18 and annular groove 33 and port 19 and annular groove 34 respectively. A plurality of axially extending slots 35 extend from annular ring 33 whereby, in predetermined positions of valve 31 relative to housing 10, fluid communication is provided between slots 35 and housing openings 21 and then to passages 20. Axially extending slots 36 extend from annular ring 34, positioned between slots 35 whereby communication with valve housing openings 21 is provided at predetermined intervals during the rotation of the valve relative to the housing. The valve rotates in synchronism with the rotation of the star member 25 and slot 35 correspond in number with the number of teeth 27 of star 25. In the motor shown, star 25 has six teeth 27 and, correspondingly, valve 31 includes six slots 35 and six slots 36 positioned therebetween. The valve rotates in bore 15 with valve surface 37 in precision fit therewith, providing the tightest fit possible, yet allowing the valve to rotate. The valve is typically constructed of hardened steel and rotates in the cast iron housing. Of course, other materials may be used and, in fact, there may be some advantages to securing a bronze sleeve to the housing in which the valve could rotate.

Output shaft 38, typically constructed of hardened steel, includes bore 38a and is assembled in bore 15 of housing 10 and is supported in bore 15 by rear sleeve bearing 39 and front sleeve bearing 40. Shaft 38 is substantially concentric within valve bore 32 and has an outside diameter less than the diameter of bore 32 providing the predetermined spacing shown at dimension X. The center line of shaft 38 is indicated at **38*b* and shaft bore 38*a* is substantially concentric with motor axis 16. Rear and front bearings 39 and 40 respectively have outside diameters substantially equal to the diameter of bore 15 and a press fit therebetween is effected. The inner diameters of sleeve bearings 39 and 40 are substantially equal to the outer diameter of shaft 38 within bore 15 and substantially concentric with valve 31**. It should be noted that commercially available bearings do not provide the close tolerances necessary to maintain the alignment of the shaft in the bearings as can be obtained for the alignment of the valve within the housing from precision machining. Consequently the spacing at X cannot be assured to be uniform.

Shaft 38 includes a journalled output portion 41 adapted to receive a suitable mechanism to be driven. An annular seal 42 is positioned in counter-bore 17 of housing 10 within annular groove 43 and serves to prevent leakage of operating fluid through this point. An additional seal 44 is secured in groove 45. A thrust bearing assembly 46 abuts shoulder 47 of housing section 10 and is sandwiched between the shoulder and front bearing 40. The thrust bearing is commercially available. The valve is joined to the shaft by a connecting pin 51. Connecting pin 51 projects radially outwardly from output shaft 38 and is received in slot 52 in valve 31. Pin 51, if desired, may be sized and used as a shear pin. If the valve jams relative to the housing, the pin will shear, separating the driving shaft from the driven valve, stalling the motor and preventing further damage to the components. It should be noted that slot 52 in valve 31 allows for axial movement of pin 51 relative to valve 31, thereby preventing any misalignment of shaft 38 in housing 10 from affecting the axial alignment of valve 31.

Valve 31 includes annular grooves 54, 55 and 56 axially spaced along internal bore 32. Commercially available V-type one way seals 57 and 58 are positioned in the outer grooves 54 and 56 to prevent fluid flow outwardly from the valve between the shaft and valve. A quad-ring or two way seal 59 is positioned in groove 55. An annular valve pressure balancing area **59*a* is defined by the valve bore surface, the shaft external surface, one way seal 57 and two way seal 59. Similarly, valve balancing area 59*b* is defined by the valve bore surface, the shaft external surface, one way seal 58 and two way seal 59. The valve pressure balancing areas 59*a* and 59*b* are adapted to receive fluid under pressure, urging valve 31 into precision fit with housing 10 and preventing collapsing of the valve under very high pressures. Opening 60 in valve 31 is in fluid communication with port 18 and annular groove 33 whereby fluid under pressure may flow into area 59*a* urging valve 31 outwardly into close contact with housing 10 with the surface of bore 15 in tight sealing relation with surface 37 of valve 31. If it is desired to reverse the operation of the motor, inlet fluid under pressure may be directed to flow through port 19 into ring 34 and then into opening 61 which is in fluid communication with pressurizing area 59*b*, urging valve 31 outwardly against housing section 10 providing a tight sealing engagement between the valve surface 37 and the surface of the housing at bore 15**. It should be noted that any of several commercially available seals could be used and that they could be placed in grooves in the shaft, to seal against the valve bore surface, or partial grooves could be utilized in each of the valve and shaft members.

Valve plate 11 includes annular thrust bearing receiving socket 62, having a thrust bearing 63 therein providing thrust receiving means for shaft 38.

A drive member 64 joins shaft 38 with the gerotor set 12 by connection to the star member 25. This drive member is elongate, having its axis **64*a* oriented generally along motor axis 16, but at a slight angle thereto to accommodate the eccentricity of the star 25 relative to the ring member 24. Drive 64 is always in this slightly angulated position relative to the motor axis 16 as it functions during operation of the motor. Drive member 64 includes rear head element 65 and front head element 66. Each head element typically has frustospherically shaped splines which are equal in number to and mesh with corresponding splines 67 on star member 25 and splines 68 within shaft bore 38*a*. Since drive member head element 65 is positioned in star 25 which rotates and orbits, this end has both orbiting and rotational movement. However, drive member head element 66 is positioned within shaft 38 and rotates only. The frustospherically shaped heads and the spline connections function as a type of universal joint which allows this movement for drive member 64, providing means to cancel the orbiting motion of the star, translating only the rotating motion thereof. The star rotates at the same r.p.m. as the valve, the shaft and the drive member. However, the star orbits six times about motor axis 16** for each revolution of the star about its own axis.

A drive member positioning ring 69 is located in bore 38*a* of shaft 38 and rotates therewith retaining drive member 64 in proper position relative to star element 25 and shaft 38. Drive positioning member 69 includes an opening (not shown herein) whereby oil which leaks through the internal high pressure interfaces may pass into conduit 70 and thence to passages 71 and 72, providing lubrication to bearing 40. Lubrication to bearing 39 is supplied by oil which leaks through the internal high pressure interfaces. The spline connections of drive member 64 to shaft 38 and star 25 are also lubricated from oil leakage.

Figure 4:
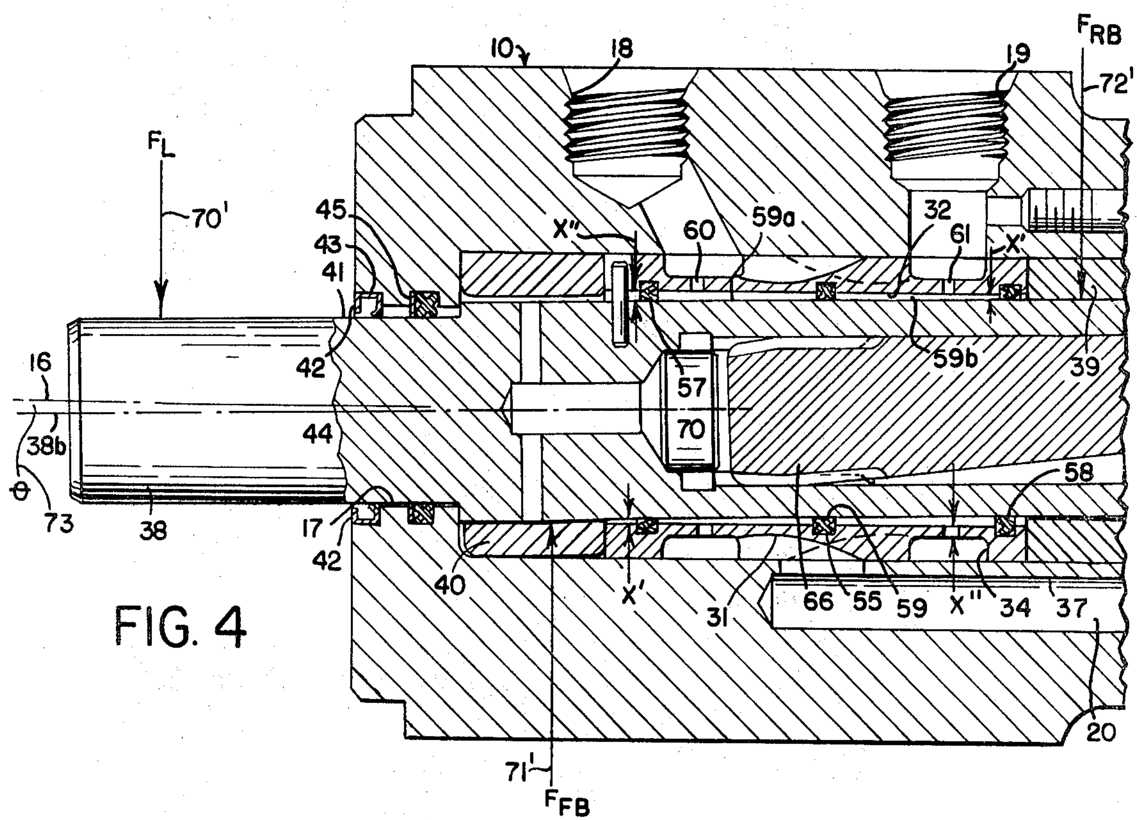
FIG. 4 is a partial longitudinal sectional view of the fluid operated motor of FIG. 1 showing misalignment of the shaft caused by radial load and subsequent wear on the bearings, slightly exaggerated for purposes of clarity.

The effects of wear between the shaft and the supporting bearings and the resulting displacement of the shaft within the housing 10 are best shown by reference to FIG. 4. It should be noted that commercially available bearings do not provide as close a fit between the bearings and the shaft as can be obtained in the fit between the valve and housing. The resulting shaft misalignment relative to the valve is similar to the effect of bearing wear, but not to as great a degree.

A radial load is indicated on the output shaft 38 at numeral 70'. Corresponding reaction forces of the forward bearing 40 on the shaft are indicated at 71' and of the rear bearing on the shaft at 72'. The shaft axis 38*b* is displaced from the motor or housing axis 16 by angle $\theta$ indicated at 73. This angular displacement causes the spacing between shaft 38 and valve 31 to be decreased as indicated by dimension X', and increased by the dimension idicated at X''. It should be noted that valve pressure balancing areas 59*a* and 59*b* are maintained thereby securing proper operation of the valve and preventing collapsing under high pressure and under high radial load. When dimension X' is reduced to zero from wear of the shaft in the bearings, the bearings may be changed with little difficulty. There is no decrease in efficiency of the motor as dimension X decreases to X'. After this dimension is reduced to zero, of course, the valve functions as a bearing and inefficiencies result.

Figure 5:
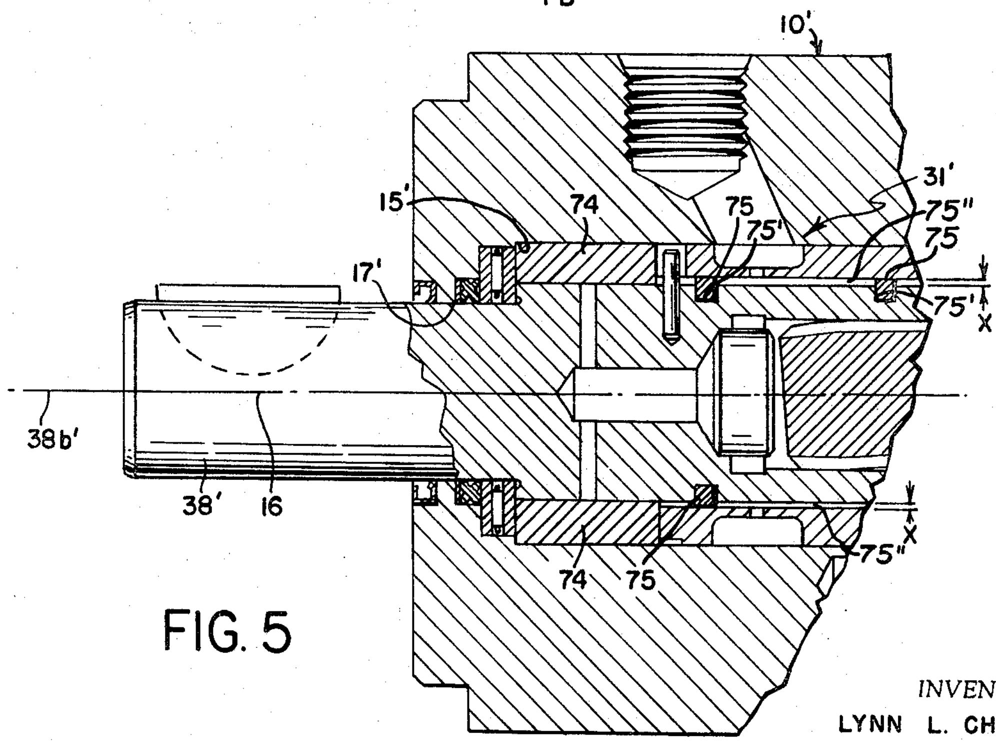
FIG. 5 is a partial sectional view of an alternate bearing configuration for the output shaft of the motor of FIG. 1.

An alternate embodiment of the front bearing arrangement for the motor shaft is shown in FIG. 5. Housing 10' includes an output shaft receiving bore 15' with shaft 38' having centerline 38*b'* aligned with motor axis 16' assembled in bore 15'. Bearing 74 supports the shaft in bore 15'. Sealing rings 75 are seated in ring receiving grooves 75' in shaft 38' defining pressure area 75''. Sealing rings 75 could be of a relatively soft O-ring material or, alternately, constructed of a relatively hard material similar to a piston ring.

Figure 6:
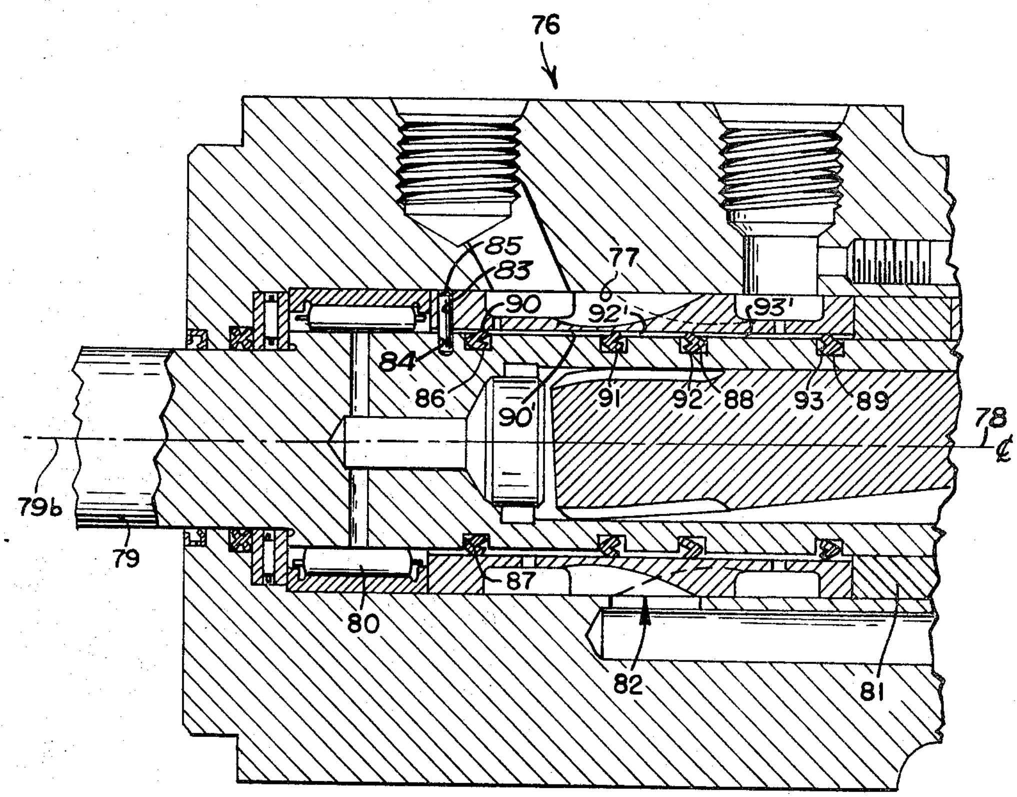
FIG. 6 is a partial longitudinal sectional view of an alternate embodiment of this invention.

Another alternate embodiment of the fluid operated motor of this invention is shown in FIG. 6. Housing 76 includes bore 77 having centerline 78 which may also be termed a motor axis. Shaft 79, having an axis 79*b* is positioned in bore 77 for rotation therein and supported by front roller bearings 80 and rear bearing 81. A valve 82 is concentric with shaft 79 and rotates about the motor axis 78.

Valve 82 includes a pin receiving socket 83 and shaft 79 includes a similar pin receiving socket 84 adapted to mate with the receiving socket of valve 82. Pin 85 is inserted in mating sockets 83 and 84 providing detachable connection between valve 82 and shaft 79.

A plurality of circumferential grooves 86, 87, 88 and 89 are shown in shaft 79, spaced axially along the shaft. Groove 86 contains one way V type seal 90 to seal between valve 82 and shaft 79. A similarly oriented one way seal 91 is positioned in groove 87. Seal 92 is positioned in groove 88 and is oriented opposite from seals 90 and 91. Seal 93 is positioned in groove 89 in the same manner and direction as seal 92. Seals 90 and 92 define a pressure balancing area 90' and 92' for a given direction of motor rotation. Seal 91, which is positioned between seals 90 and 92 allows flow of pressurized fluid up to seal 92, maximizing the area in which oil under pressure may flow to balance valve 82. Similarly, seals 91 and 93 define a like pressure balancing area 92' and 93' which is utilized in the event the motor rotation is reversed. One way seal 92, between seals 91 and 93, allows flow of fluid under pressure up to seal 91, optimizing the pressure balancing area for reverse rotation.

Figure 7:
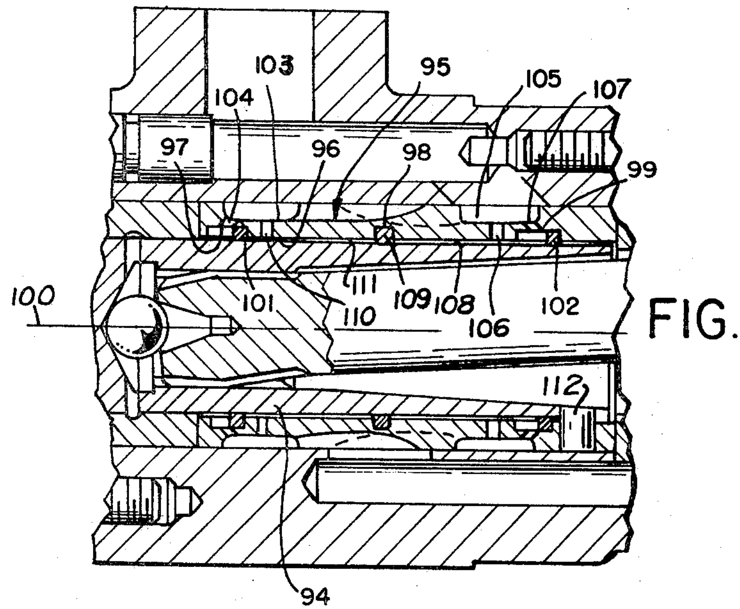
FIG. 7 is a partial, longitudinal sectional view of another alternate embodiment of this invention.

Another alternate embodiment of this invention, FIG. 7, shows a valve 95 having a plurality of annular shaft confronting grooves therein spaced along internal bore 96 and denoted by numerals 97, 98 and 99. It should be noted that the outer annular grooves, 97 and 99 are elongate extending along axis 100 of the motor. O-rings 101 and 102 are positioned in slots 97 and 99 respectively and are of a width or diameter considerably less than the length of slots 97 and 99. Therefore, O-rings 101 and 102 are free to move axially in receiving slots 97 and 99 depending upon forces exerted thereon. In FIG. 7, O-ring 101 is shown positioned by exhaust forces and O-ring 102 is shown positioned by pressure forces. Fluid flowing through the motor is exhausted through valve annular groove 103 and fluid under pressure which escapes through high pressure interfaces in the motor flows through slot 97 into opening 104, which communicates with groove 103, and then externally of the motor. This fluid flow urges seal 101 into the position shown. Operating fluid under pressure flows into annular ring 105 and then through passage 106 urging O-ring 102 into the position shown, allowing pressurizing of area 108 between the valve and shaft and between O-ring 102 and O-ring 109 which is securely affixed in slot 98. Opening 107 communicates with the pressure area 108 for pressure balancing and also communicates with pressure groove 105 for the same purpose. When the motor is reversed, pressure and exhaust is reversed and fluid under pressure at ring 103 flows into passage 110, pressurizing area 111 between the shaft and valve and between O-rings 101 and 109 and urging O-ring 101 along the motor axis into the position corresponding to the position shown for O-ring 102. Correspondingly, O-ring 102 is urged axially in slot 99 by fluid under pressure escaping to high pressure interfaces into the position shown for O-ring 101 thereby uncovering passage 107 for exhaust of high pressure leakage fluid through passage 107 and into groove 105. Pin 112 connects the valve with the shaft.

Since the general operation of a fluid operated axial valve motor is well known in the art, it will be discussed only briefly herein for purposes of more completely describing the operation of the invention.

Fluid under pressure, for example oil, enters port 18 and is conducted to annular groove 33 in valve member 31. The fluid under pressure is then conveyed through predetermined of slots 35, into openings 21 and then to passages 20 in valve housing 10. Passages 20 are in fluid communication with predetermined cells 29 in gerotor mechanism 12 with valve plate 11 and its corresponding passages 23 positioned between displacement mechanism 12 and valve housing 10 with openings 23 in fluid communication with corresponding passages 20 in the valve housing. Fluid under pressure is conveyed to cells 29 on one side of line of eccentricity 30, causing gerotor star member 25 to rotate and orbit.

Drive member 64 connects output shaft 38 with star member 25 and the rotational movement of the star is transmited to the shaft by the drive member. Valve 31 is connected to shaft 38 by drive pin 51 and the valve rotates in synchronism with the star member. A commutator action is thereby established and fluid under pressure is conveyed to cells 29 in a predetermined pattern. Simultaneously, fluid is exhausted from cells 29 on the opposite side of line of eccentricity 30 through passages 23 in valve plate 11 and then through corresponding passages 20 in housing 10. The exhaust fluid ultimately passes through predetermined openings 21 into exhaust fluid slots 36 to be ultimately exhausted through annular groove 34 in fluid communication with port 19. As long as fluid is provided to inlet port 18, this operation is sustained and power may be taken off at output shaft 38.

As shown in FIG. 1, valve 31 is concentric with shaft 38, is positioned between rear bearing 39 and front bearing 40 and is separated at predetermined distance from shaft 38 as noted by dimension X. The inside diameter of valve 31 is on the order of two percent greater than the outside diameter of shaft 38 along the concentric portions. Shaft 38 is supported in housing 10 for rotation substantially along motor frame longitudinal axis 16. Valve 31 is in precision rotative fit with bore 15 of housing 10 and takes its alignment therefrom. Valve 31 rotates about frame axis 16 and, for most efficient operation must remain in precision rotative fit relative to the housing, independent of the alignment of shaft 38.

Assuming, for purposes of illustration, that fluid under pressure enters port 18, fluid under pressure then encircles valve 31 at annular groove 33 urging the valve inwardly at this groove. Further, fluid under pressure surrounds valve 31 at longitudinal slots 35 further urging valve 31 inwardly in response to fluid under pressure. In order to maintain a precision rotative fit between housing 10 and valve 31, and the corresponding efficiencies present when there is a precision fit therebetween, compensation or pressure balancing for this inward force is necessary. Referring now to FIG. 1, pressure zone **59*a* is provided and may be defined as bounded by seal 57, seal 59, the internal surface 32 of valve 31, and the external surface of shaft 38. Fluid under pressure is conveyed to pressure zone 59*a* through passage 60 which is in fluid communication with port 18. In this way, the fluid under pressure in zone 59*a* urges valve 31 radially outwardly, compensating for the radially inward pressure effects of the pressurized fluid at groove 33 and along slots 35**.

Correspondingly, in the event the direction of rotation is reversed, port 19 becomes the fluid inlet port and fluid under pressure passes through passage 61 into pressure zone **59*b* urging the valve radially outwardly, compensating for inward forces. It should be noted that seals 57 and 58 are one way V type seals which allow fluid escaping from the high pressure interfaces in the motor to be exhausted. For example, assuming that pressure zone 59*a* encloses fluid under pressure, seal 59 separates zone 59*a* from zone 59*b* which is then under exhaust. Seal 58 allows fluid escaping through high pressure interfaces to enter zone 59*b* to be exhausted through passage 61 and through port 19**.

It should be noted that sealing must be maintained regardless of the position of shaft 38 relative to valve 31. Referring now to FIG. 4, shaft 38 is shown displaced from motor axis 16 by angle $\theta$, the angle between motor axis 16 and shaft axis **38*b*. It should be noted that the V type seal 57 may expand or collapse as necessary and the corresponding seal 58 may do likewise. In this manner, the pressure zone 59*a* or 59*b*** is maintained.

Referring now to FIG. 5, piston rings 75 are utilized and are shown mounted or seated in shaft 38′. These piston rings take their alignment from and seal against valve 31′ regardless of the position of shaft 38′.

In some applications requiring particularly high pressure fluid, it may be necessary to increase the pressure zone to provide a greater surface for the fluid under pressure to act upon the valve to compensate for the higher operating pressures and corresponding increased inward pressures on the valve. Referring now to FIG. 6, valve balancing seals 90 and 92 define a pressure zone including pressure zone 90′ and 92′. Seal 91, since it is a one way type, may be disregarded in defining the pressure zone which acts upon valve 82 urging it radially outwardly, compensating for fluid under pressure urging valve 82 radially inwardly. Correspondingly, assuming a reverse direction of rotation, pressure zone 92′ and 93′ urges valve 82 radially outwardly. Seal 92, since it is one way, allows pressure zone 92′ to be added to pressure zone 93′ and one way seal 91 prevents fluid under pressure from flowing into pressure zone 90′ which is under exhaust.

Referring now to FIG. 7, O-ring 101 is shown positioned by exhaust forces and O-ring 102 is shown positioned by pressure forces. Fluid flowing through the motor is exhausted through valve annular groove 103 and fluid under pressure which escapes through high pressure interfaces in the motor flows through slot 97 into opening 104, which communicates with groove 103 and then externally of the motor. This fluid flow urges seal 101 into the position shown. Operating fluid under pressure flows into annular ring 105 and then through passages 106 urging O-ring 102 into the position shown, allowing pressurizing of pressure zone 108 between the valve and the shaft and between O-ring 102 and O-ring 109 which is securely affixed in slot 98. Opening 107 communicates with pressure area 108 for pressure balancing and also communicates with pressure groove 105 for the same purpose. When the motor is reversed, pressure and exhaust is reversed and fluid under pressure at ring 103 flows into passage 110, pressurizing area 111 between the shaft and valve and between O-rings 101 and 109 and urging O-ring 101 along the motor axis into the position corresponding to the position shown for O-ring 102. Correspondingly, O-ring 102 is urged axially in slot 99 by fluid under pressure escaping through high pressure interfaces into the position shown for O-ring 101 thereby uncovering passage 107 for exhaust of high pressure leakage fluid through passage 107 and into groove 105.

It should be noted that the fluid operated motor described herein may be reversibly operated as a motor as well as operated in either direction of rotation depending upon the circuitry of the installation in which the motor described herein is applied. Further, it should be noted that the motor described herein is usable as a pump by simply putting power into the output shaft and taking the fluid pumped from the proper motor port.

From the foregoing it will be seen that I have provided a reversible fluid operated motor of the axial valve type having provision for operation efficiently and properly under high operating pressures, maintaining the valve in precision rotative fit relative to the housing regardless of the alignment of the output shaft driving the valve member.

It will, of course, be understood that various changes may be made in the form, details, arrangement and proportions of the various parts without departing from the scope of this invention.

What is claimed is:

1. A fluid operated motor of the axial valve type, said motor comprising:

a generally cylindrically shaped frame having a longitudinal axis, a gerotor type displacement mechanism mounted in said frame and having an internally toothed ring member having an axis coextensive with the longitudinal axis of said frame and in fixed relation thereto, and an externally toothed star member having at least one less tooth than said ring member and having an axis, said star member disposed eccentrically in said ring member for orbital movement about the axis of said ring member and rotational movement about its own axis in the opposite direction from and at a slower speed than said orbital movement during relative movement between said members, an output shaft rotatably mounted in said frame for rotation substantially about the longitudinally axis thereof, said output shaft supported by a forward bearing at the output end thereof, said output shaft having a drive member receiving opening therein generally concentric with the longitudinal axis of said frame, a drive member connecting said displacement mechanism with said output shaft, said drive member having a rear star member engaging portion and a front drive member engaging portion providing universal joint means between said output shaft and said displacement mechanism, said drive member transmitting rotational movement of said star member to said shaft in synchronism therewith and cancelling the orbiting movement of said star member relative to said output shaft, a valve member rotatably mounted in said frame for rotation at the longitudinal axis thereof, in precision rotative fit relative to said frame and taking its alignment therefrom, said valve member positioned concentric with said output shaft adjacent the forward bearings thereof, said valve member having an inside diameter greater than the outside diameter of said output shaft whereby said valve member is spaced a predetermined distance from said output shaft and is thereby independent of the alignment of said shaft relative to said frame, a pair of axially spaced opposed annular pressure zone defining seals seated between said valve member and said output shaft defining a pressure zone therebetween, the pressure zone in fluid communication with fluid under pressure whereby fluid under pressure in said pressure zone urges said valve member in precision rotative fit relative to said frame member and in alignment therewith unaffected by alignment of said output shaft, and a valve connecting mechanism connecting said valve with said shaft for synchronous rotation with said displacement mechanism whereby fluid is provided to and exhausted from said displacement mechanism in a predetermined sequence.

2. The fluid operated motor of claim 1 wherein said motor is reversible and includes:

a pressure zone defining seal spaced axially along said valve member and seated between said valve member and said output shaft in opposed relation to said pair of opposed annular pressure zone defining seals whereby a second pressure zone is defined adapted to urge said valve member into precision rotative fit relative to said frame member for reverse rotation of said motor.

3. The fluid operated motor of claim 1 wherein said motor is reversible and includes a second pair of axially spaced opposed annular pressure zone defining seals positioned and seated adjacent said pair of opposed annular pressure zone defining seals adapted to urge said valve member in precision rotative fit relative to said frame member for reverse rotation of said motor.

4. The fluid operated motor of claim 1 wherein said pair of opposed annular pressure zone defining seals are O-rings.

5. The fluid operated motor of claim 1 wherein said pair of opposed annular pressure zone defining seals are piston rings.

6. The fluid operated motor of claim 2 wherein at least one of said pressure zone defining seals is a one way seal to allow fluid to enter a predetermined pressure zone.

7. The fluid operated motor of claim 1 wherein said pair of axially spaced opposed annular pressure zone defining seals are piston rings seated in said output shaft.

8. The fluid operated motor of claim 2 wherein at least one of the pressure zones is in fluid communication with fluid under pressure through a pair of passages and wherein at least one of said pressure zone defining seals is movable axially along the pressure zone responsive to fluid under pressure alternately uncovering one of the pair of passages to define a pressure zone and covering the passage to provide for exhaust of fluid therefrom.

9. The fluid operated motor of claim 3 wherein the center pair of pressure zone defining seals are one way seals oriented opposite one from the other whereby a predetermined pressure zone is extended between a pair of pressure zone defining seals having a one way seal disposed therebetween.

References Cited

UNITED STATES PATENTS

| | | | |
|---|---|---|---|
| Re. 25,126 | 2/1962 | Charlson | 91—56UX |
| 3,348,493 | 10/1967 | Easton | 103—130 |
| 3,352,247 | 11/1967 | Easton | 103—130 |
| 3,452,543 | 7/1969 | Goff et al. | 91—56X |

EVERETTE A. POWELL, Jr., Primary Examiner

U.S. Cl. X.R.

103—130